United States Patent Office 3,510,120
Patented May 5, 1970

---

3,510,120
APPARATUS FOR ASSEMBLING BATTERY PLATE PACKS
John Derek Harris, Solihull, England, assignor to Joseph Lucas (Industries) Limited, Birmingham, England
Filed Dec. 6, 1967, Ser. No. 688,549
Claims priority, application Great Britain, Dec. 15, 1966, 56,175/66
Int. Cl. B65g 57/00
U.S. Cl. 270—58     1 Claim

ABSTRACT OF THE DISCLOSURE

Apparatus for assembling battery plate packs comprises a conveyor having a laterally inclined surface, a wall upstanding from the lower edge of said surface, and means on the conveyor for transferring battery plates and separators alternately from a plurality of fixed stations onto said surface, so that they are arranged on said surface into a pack one edge of which is in contact with the wall.

---

This invention relates to apparatus for assembling battery plate packs.

Apparatus according to the invention comprises a conveyor having a laterally inclined surface, a wall upstanding from the lower edge of said surface, and means on the conveyor for transferring battery plates and separators alternately from a plurality of fixed stations onto said surface, so that they are arranged on said surface into a pack one edge of which is in contact with the wall.

Figure 1:
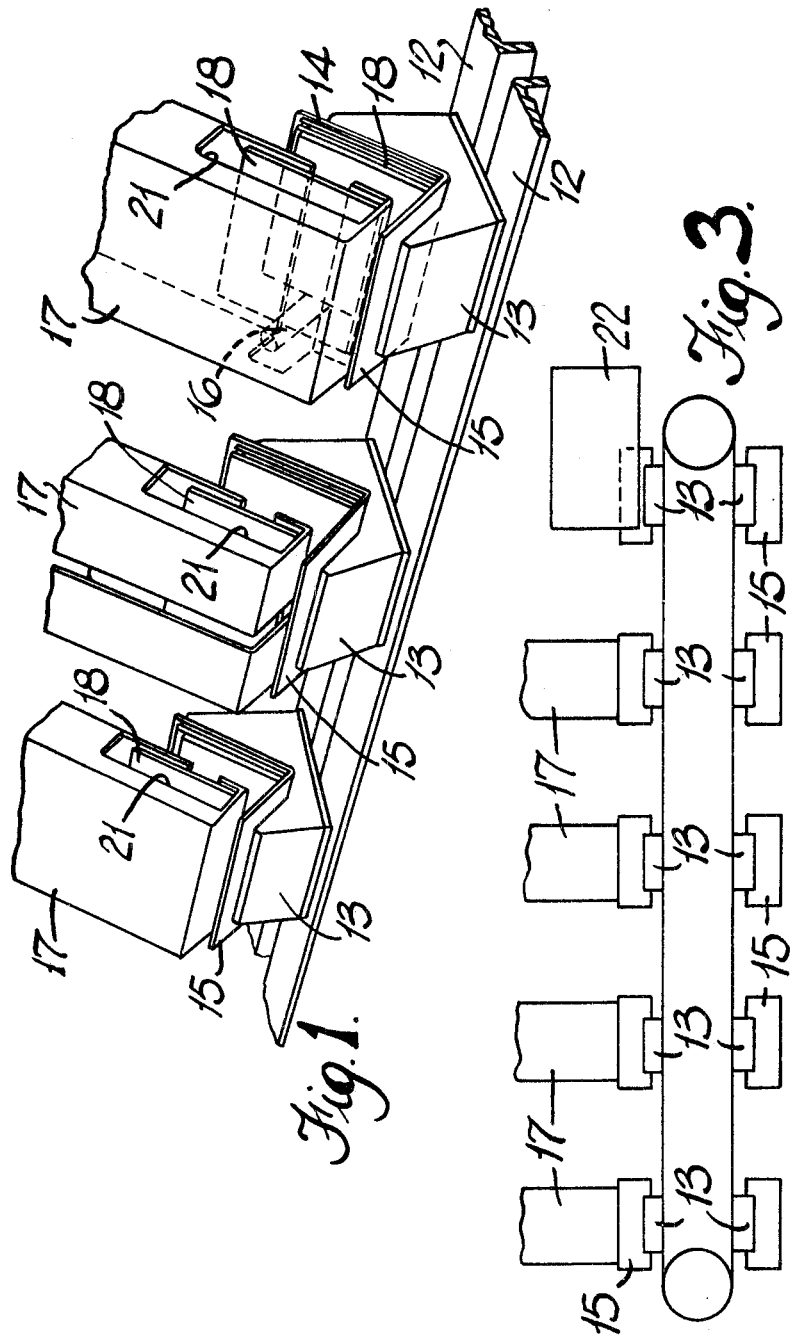
Figure 2:
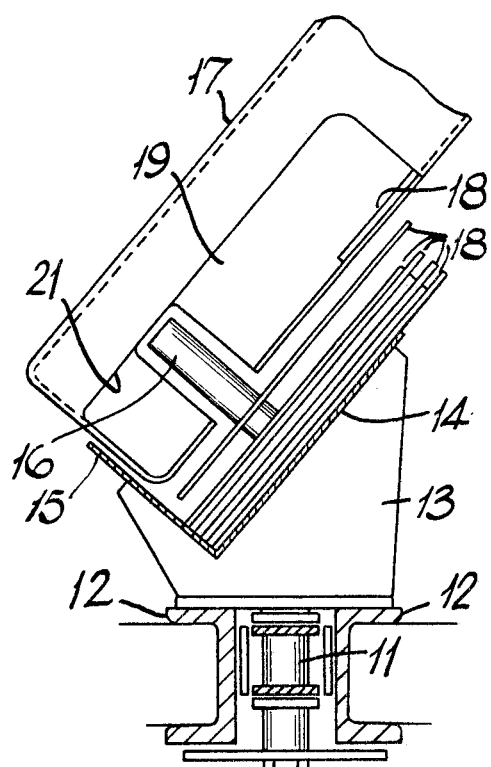

One example of the invention is illustrated in the accompanying drawing wherein FIG. 1 is a fragmentary perspective view of an apparatus for assembling battery plate packs, FIG. 2 is a sectional view of part of the apparatus shown in FIG. 1 and FIG. 3 is a diagrammatic representation of the whole apparatus.

Referring to the drawings, there is provided a chain drive 11 which runs between guides 12. Spaced along its length the chain drive supports a plurality of carriers 13 each carrier including an inclined base 14 and a side wall 15 at right angles thereto, and extending from the lower edge thereof. Extending upwardly from the rear edge of the base 14 of each carrier 13 is a rodlike finger 16.

The conveyor moves under a series of chutes 17 each of which receives a component 18 of a battery plate pack. The components 18 slide down their respective chutes and lodge at the bottom thereof. Each chute includes a channel 19 through which the fingers 16 of the carriers 13 pass in use and each chute further includes a slot 21 in the side thereof through which the respective component can pass.

In use, as a carrier 13 on the chain drive 11 passes under a chute 17 the finger 16 engages the component 18 within the chute 17 so that as the conveyor progresses the component 18 is pushed through the slot 21 and falls onto the carrier. Since the carrier 13 is inclined the component 18 will slide laterally with respect to the conveyor until it engages the wall 15 of the carrier. As each component drops onto the carrier it is automatically located in the desired position laterally by the wall 15 of the respective carrier and longitudinally by the finger 16. Thus a battery plate pack is built up as the conveyor progresses under the series of chutes. After each carrier 13 has passed the last of the chutes 17 it passes through an unloading station 22 (FIG. 3) wherein the battery pack is removed from the carrier 13 and is passed on to a battery building plant.

Having thus described my invention what I claim as new and desire to secure by Letters Patent is:

1. Apparatus for assembling battery plate packs comprising in combination, an endless conveyor, a plurality of battery plate pack carriers, means mounting said carriers in spaced relation on said conveyor along the length of the conveyor, an inclined battery plate pack component receiving surface on each carier, said component receiving surfaces being inclined laterally with respect to the direction of travel of the conveyor, a wall upstanding from each of said carriers, said walls being positioned at the lower, lateral edges of the respective receiving surfaces of their respective carriers, a finger upstanding from each of said receiving surfaces, each finger being positioned adjacent the trailing edge of said receiving surface of its respective carrier, and a plurality of fixed stations positioned above the conveyor, and beneath which the carriers pass in sequence, alternate fixed stations being arranged to present battery plates and separators singly to the carriers with the battery plates and separators positioned substantially parallel to said inclined receiving surfaces of the carriers so that as said carriers pass beneath said fixed stations said fingers extract said battery plates and separators from their respective fixed stations, and guide said battery plates and separators onto said component receiving surfaces where the battery plates and separators engage said walls of the carriers, the walls and the fingers of said carriers thereby acting as collating means whereby packs of battery plates and separators are built up in said carriers with the battery plates and separators aligned.

References Cited

UNITED STATES PATENTS

| | | | |
|---|---|---|---|
| 591,801 | 10/1897 | Agnew. | |
| 2,561,070 | 7/1951 | Phythian | 270—58 |
| 2,859,859 | 11/1958 | Winkel et al. | 29—204 X |
| 2,908,377 | 10/1959 | Winkel et al. | 29—204 X |

EVON C. BLUNK, Primary Examiner

D. D. WATTS, Assistant Examiner

U.S. Cl. X.R.
29—204; 198—35; 214—6